United States Patent [19]

Shimizu et al.

[11] Patent Number: 4,943,003
[45] Date of Patent: Jul. 24, 1990

[54] CONTROL DEVICE FOR HEAT PUMP WITH HOT-WATER SUPPLY FACILITY

[75] Inventors: Mitsuo Shimizu; Kazuo Maehara; Hidenobu Shinohara; Hideo Kojima, all of Isesaki, Japan

[73] Assignee: Sanden Corporation, Isesaki, Japan

[21] Appl. No.: 310,386

[22] Filed: Feb. 15, 1989

[30] Foreign Application Priority Data

Feb. 15, 1988 [JP] Japan ................................. 63-32470

[51] Int. Cl.$^5$ .............................................. G05B 13/02
[52] U.S. Cl. .................................. 237/2 B; 165/11.1; 236/94; 364/156
[58] Field of Search ................. 237/2 B; 165/29, 11.1; 219/279; 62/160, 236; 236/94; 364/156

[56] References Cited

U.S. PATENT DOCUMENTS 4,716,957  1/1988  Thompson et al. ................. 236/49.3

*Primary Examiner*—William E. Wayner
*Attorney, Agent, or Firm*—Banner, Birch, McKie & Beckett

[57] ABSTRACT

A control device for a heat pump system having a hot-water supply facility is disclosed which comprises an input device for inputting the cost of electricity for operating a heat pump and for inputting the cost of fuel for operating a boiler. A first sensor detects the temperature of the ambient air. A second sensor detects the moisture of the ambient air. A third sensor detects the temperature of the hot-water supply. An operation circuit selects an operation mode on the basis of the output signals received from the sensors. A comparison circuit selects the cheaper energy form based on cost data inputted from the input device in the heating air mode and in the hot-water supply mode. A control circuit selectively operates the heat pump or the boiler based on the result of the comparison performed by the comparison circuit.

1 Claim, 3 Drawing Sheets

CONTROL DEVICE FOR HEAT PUMP WITH HOT-WATER SUPPLY FACILITY

TECHNICAL FIELD

The present invention relates to a heat pump system, and more particularly, to a control device for a heat pump system having a hot-water supply facility for installation in a building.

BACKGROUND OF THE INVENTION

A conventional heat pump system having a hot-water facility for use in a building includes a heat pump, a room air conditioning unit disposed within each room, a circulating pump for supplying each room air conditioning unit with heating and cooling medium, a backup boiler for providing an supplementary source of heat in the air heating operation, a hot-water supply tank, a hot-water supply boiler and a hot-water circulating pump. A preheating heat exchanger is disposed in the hot-water supply tank.

Referring to FIG. 1, a conventional control device for a heat pump system having a hot-water supply facility is shown. The control device includes an ambient air temperature sensor S1, an ambient air moisture sensor S2, a hot-water supply temperature sensor S3, a hot-water supply switch SW for detecting the presence or absence of a hot-water supply, and an operation circuit 20 for selecting an operation mode, i.e., the cooling air mode, the cooling air and hot-water supply mode, the heating air mode, the hot-water supply mode, or the heating air and hot-water supply mode, in accordance with output signals from sensors S1, S2, S3 and switch SW. The device also includes a control circuit 30 for operating the system components in accordance with the mode selected by operation circuit 20.

To explain further, with reference to FIG. 2, in the cooling air mode, heating and cooling medium contained in tank 16 is cooled during operation of heat pump 1, and is distributed to room air conditioning unit 2 through conduit 17. There, the cooled medium absorbs the surrounding heat so that cooled air is supplied to the interior of the room. In addition, in the cooling air and hot-water supply mode, and in the hot-water supply mode, water in hot water supply tank 6 is heated with preheat heat exchangers 4 and 5, resepctively, during operation of the heat pump, and is then further heated by operating hot-water supply boiler 7.

In the heating mode, heat pump 1 is operated to heat the medium contained in tank 16, and if additional heat is required, backup boiler 3 is operated to further heat the medium. The heated medium is then distributed to room air conditioning unit 2 where the heat is extracted so that heated air supplied to the interior of the room. In addition, in the heating air and hot water supply mode, the water in hot-water supply tank 6 is heated by operating hot-water supply boiler 7.

In the described system, heat pump 1 is driven by an electric motor (not shown), and boilers 3 and 7 both use oil as an energy source. In the conventional arrangement, the control device is designed to use either the heat pump or one of the boilers during the heating mode and the hot-water supply mode depending upon the condition of the ambient air, e.g., the air temperature and moisture level. However, no provision is made in the conventional system for automatically operating the heat pump or the boilers depending upon which uses the cheaper energy source. Further, it is impracticable and becomes very complicated to manually control this selection because the energy costs will vary depending upon the selected air or water temperature, the operation time, and the energy unit price.

SUMMARY OF THE INVENTION

It is a primary object of this invention to provide a control device for a heat pump system having a hot-water supply facility which can reduce energy costs.

It is another object of this invention to provide a control device for a heat pump system having a hot-water supply facility which can selectively use the cheaper energy form in the operating conditions.

A control device for a heat pump system having a hot-water supply facility according to the present invention comprises an input device for inputting the electricity cost for operating a heat pump and for inputting the fuel cost for operating a boiler. A first sensor detects the temperature of the ambient air. A second sensor detects the moisture of the ambient air. A third sensor detects the temperature of the hot-water supply. An operation circuit selects the operation mode in accordance with output signals from the sensors. A comparison circuit selects the cheaper energy source, i.e., either electricity or fuel, on the basis of cost data received from the input device during the heating air mode and the hot-water supply mode, and a control circuit selectively operates the heat pump or the boilers depending upon the result of the comparison performed by the comparison circuit.

Further objects, features and other aspects of this invention will be understood from the following detailed description of the preferred embodiments of this invention when taken in conjunction with the annexed drawings.

DETAILED DESCRIPTION

Figure 2:
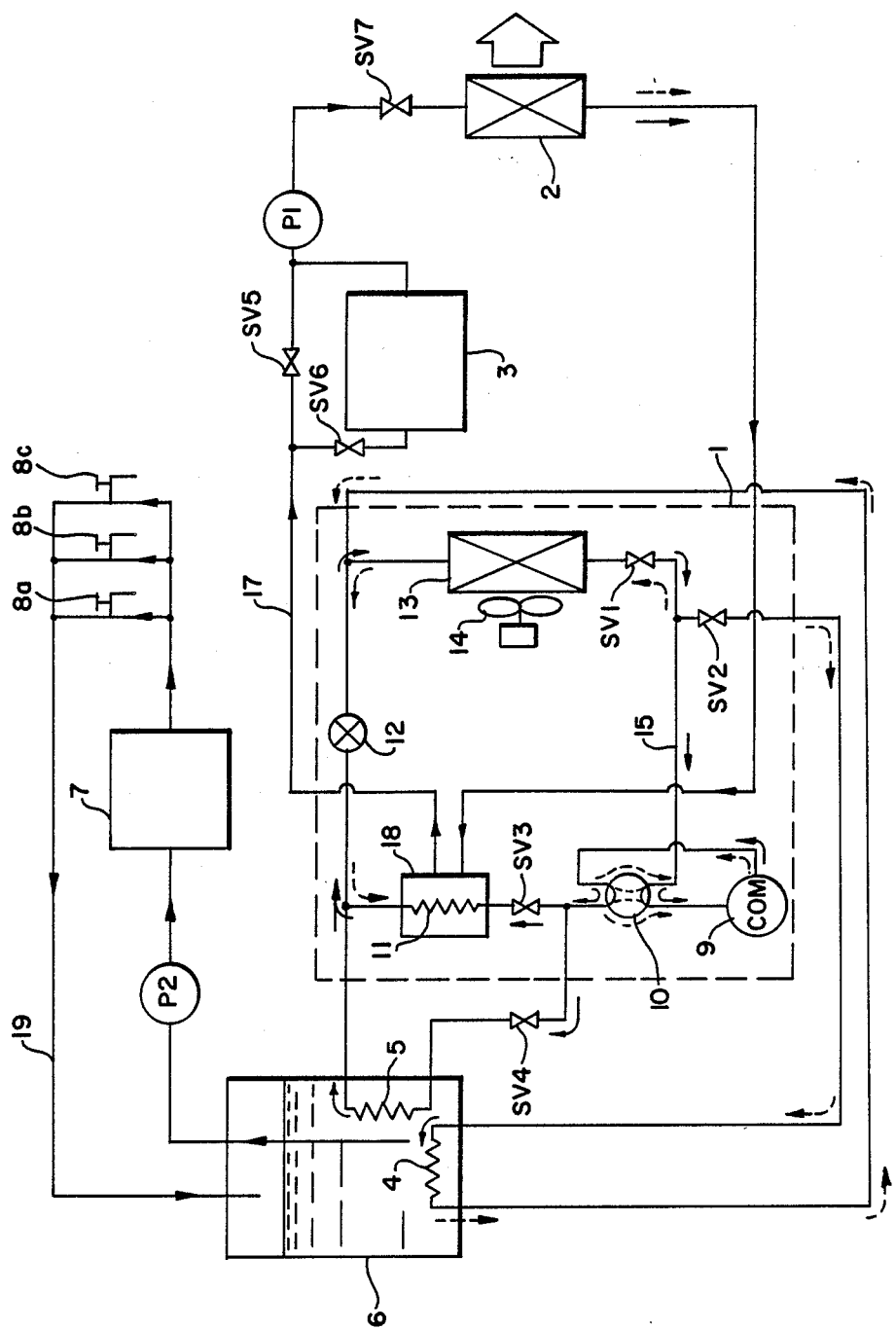
FIG. 2 is a schematic diagram of a heat pump system with a hot-water supply facility.

Referring to FIG. 2, a schematic diagram of a heat pump system having a hot-water supply facility is shown.

The heat pump system comprises a heat pump 1, a room air conditioning unit 2, a circulating pump P1, a backup boiler 3, preheat heat exchangers 4 and 5, a hot-water supply tank 6, and hot-water supply cocks 8a, 8b and 8c.

Heat pump 1 includes a refrigerant compressor 9, a four-way valve 10, a first heat exchanger 11 located inside a refrigeration compartment, an expansion valve 12, and a second heat exchanger 13 located outside the refrigerant compartment, which are all coupled to each other in series through a refrigerant conduit 15. Fan 14 is also disposed in front of heat exchanger 13. The flow of refrigerant in heat pump 1 is selectively switched in the direction of the solid-line arrows or in the direction of the dotted-line arrows by operating four-way valve 10 to thereby switch between a heating cycle and a cooling cycle.

Both the inlet port and the outlet port of room unit 2 are coupled with heating and cooling medium tank 16 through a conduit 17. Pump P1 is disposed in conduit 17 to connect the outlet port of tank 16 with the inlet port of room unit 2, and pump P1 circulates the medium within conduit 17 in the direction from tank 16 to room unit 2. A fan coil heat exchanger is used as room unit 2, and is operative to blow heated or cooled air at room unit 2 into the interior of the room.

Backup boiler 3 is disposed in conduit 17 to provide a supplemental source of heat during the heating operation, and a temperature sensor (not shown) is disposed in conduit 17 at the inlet side of solenoid valve SV6 to detect the temperature of the heating and cooling medium flowing through conduit 17. If the medium is not adequately heated after leaving heat pump 1, i.e., if the temperature of the medium detected by the temperature sensor at the inlet side of valve SV6 is lower than a predetermined temperature, solenoid valve SV6 is opened to allow the medium to flow into backup boiler 3 for further heating. Otherwise, solenoid vale SV6 is closed, and the heated medium flows through solenoid valve SV5 into room unit 2. Though only a single boiler is shown, the number of backup boilers can be increased depending upon the heating load.

Preheat heat exchangers 4 and 5 are disposed in the interior of hot-water supply tank 6 and preheat the water in the tank. Heat exchanger 4 is connected to heat exchanger 13 in parallel and heat exchanger 5 is connected to heat exchanger 11 in parallel.

One end of hot-water conduit 19 is positioned in the water in hot-water supply tank 6 and the other end of conduit 19 is connected to the top end portion of supply tank 6. Pump P2 and boiler 7 are disposed in conduit 19 in serial and hot-water supply cocks 8a, 8b and 8c are also disposed in conduit 19 in parallel. The number of boilers 7 is variable and may be changed according to the hot-water supply load.

A plurality of solenoid valves SV1-SV7 are disposed in conduits 15 and 17, and are operated to control the flow of refrigerant and medium through conduits 15 and 17, respectively, as will be explained.

Figure 1:
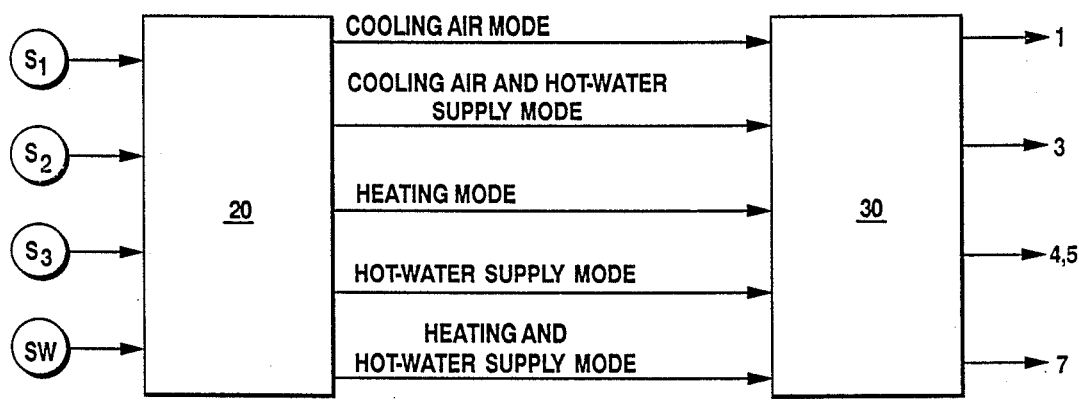
FIG. 1 is a block diagram of a conventional control device for a heat pump system.
Figure 3:
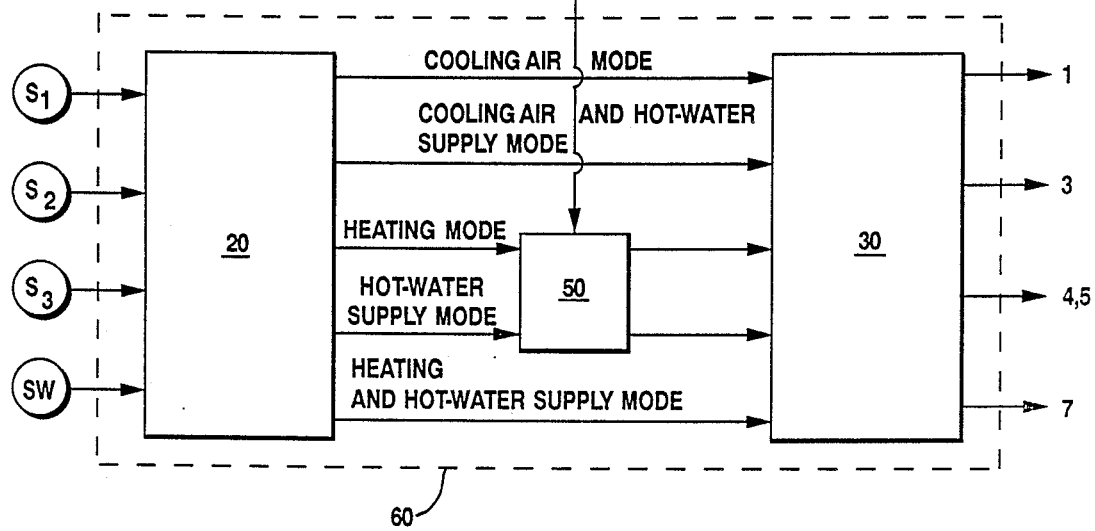
FIG. 3 is a block diagram of a control device for a heat pump system having a hot-water supply facility in accordance with this invention.

Referring now to FIG. 3, a block diagram of a control device in accordance with this invention is shown. The same numerals are accorded on the same parts as those in FIG. 1 and the description of the parts is omitted to simplify the specification.

Keyboard 40 is connected to a comparison circuit 50, which connects operation circuit 20 with control circuit 30. Various kinds of information. e.g., the cost of electricity for driving heat pump 1 and the cost of kerosine for operating backup boiler 3 or hot-water supply boiler 7, are inputted to circuit 50 through keyboard 40. Comparison circuit 50 selects the cheaper energy form on the basis of the cost data in the heating air mode and in the hot-water supply mode, and sends the result of the comparison to control circuit 30. Cost comparisons are not performed in the cooling air mode, the cooling air and hot-water supply mode or the heating air and hot-water supply mode, because these operation modes all requires use of the heat pump and/or boilers, and do not allow for ready equipment substitution on the basis of cost.

Operation circuit 20, comparison circuit 50, and control circuit 30 are implemented as a microcomputer 60, and the cost data is stored in the internal memory of the microcomputer.

Figure 4:
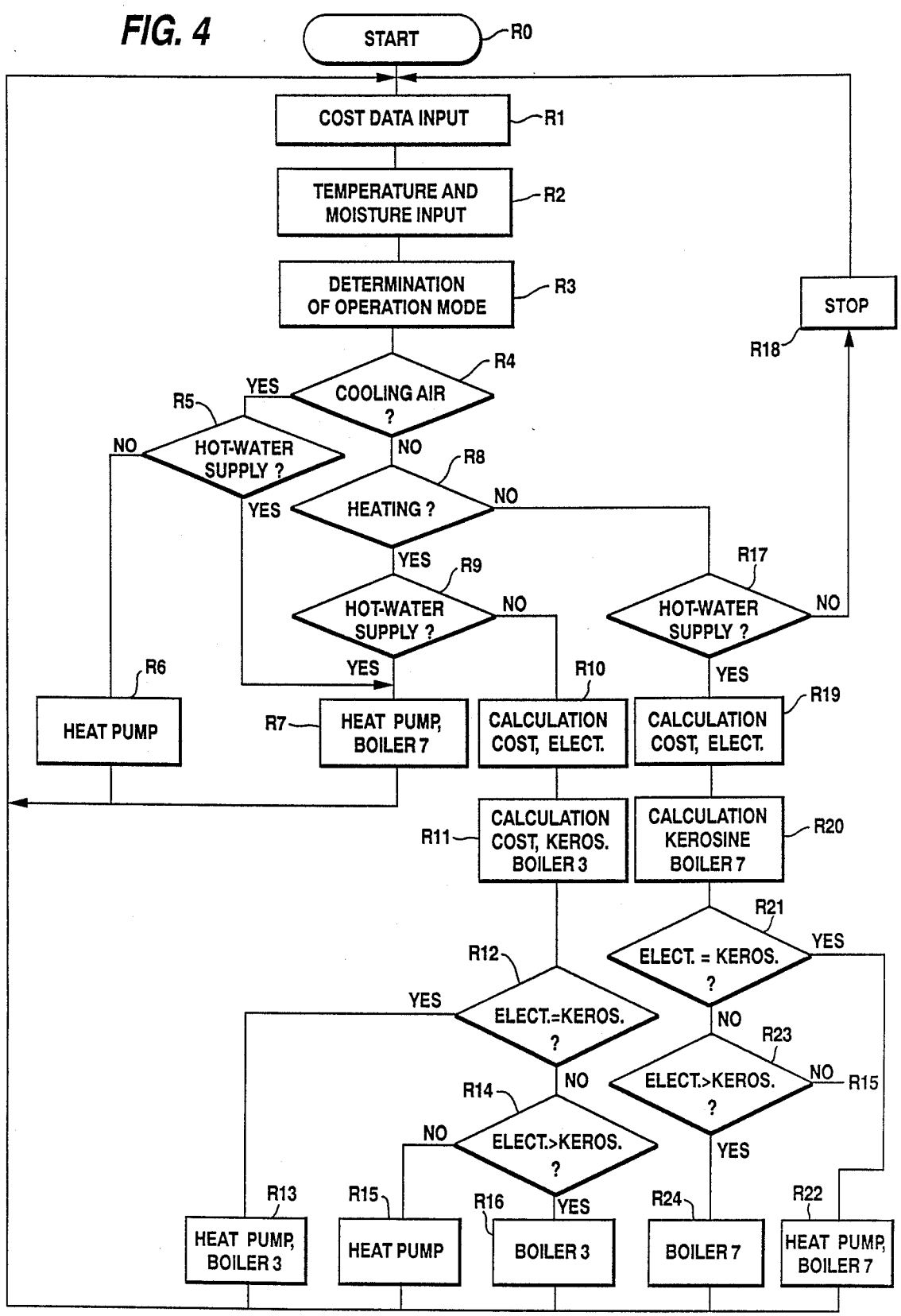
FIG. 4 is a flowchart of the control device shown in FIG. 3.

Referring to FIG. 4, the operation of a control device for a heat pump system having a hot-water supply facility is shown.

When the control device is turned in step R0, the energy cost data from keyboard 40 is inputted at step R1. Temperature data and air moisture information detected by temperature sensors S1 and S3 and moisture sensor S2, and an output signal from hot-water supply switch SW indicating the presence or absence of a hot water supply are also inputted at step R2. The operation mode of the heat pump system is then determined at step R3 on the basis of the inputted information. More specifically, the cooling air mode or the heating air mode is selected based on the input air temperature and air moisture information, and the hot-water supply mode is selected depending upon the output of hot-water supply temperature sensor S3 and hot-water supply switch SW.

In step R4, a determination is made whether the operation mode is the cooling air mode. If it is, control passes to step R5.

In step R5, a determination is made whether the operation mode is the hot-water supply mode. If the mode is not the hot-water supply mode, control passes to step R6, and heat pump 1 is controlled to operate in the cooling air mode.

In the cooling air mode, solenoid valves SV1, SV3, SV5 and SV7 are open and valves SV2, SV4 and SV6 are closed so that refrigerant in conduit 15 flows in the direction of the dotted-line arrows (FIG. 2). Gaseous refrigerant at high temperature discharged from compressor 9 flows into one end of second heat exchanger 13. The gaseous refrigerant is condensed and heat is removed from the refrigerant at heat exchanger 13, and the refrigerant changes into liquid refrigerant. The liquid refrigerant then flows through expansion valve 12 into first heat exchanger 11 where it absorbs the surrounding heat, thereby cooling the medium in tank 16, and changes into a gaseous refrigerant. The gaseous refrigerant then returns to the inlet port of compressor 9, and the cooled medium from tank 16 flows through conduit 17 into room unit 2 where the medium absorbs the surrounding heat so that cool air is blown into the interior of the room.

In step R5, if the mode is the hot-water supply mode, control passes to step R7, and heat pump 1 and hot-water supply boiler 7 are controlled to operate in the cooling air and hot-water supply mode. In this mode, during the operation of heat pump 1, solenoid valve SV1 is closed and soleniod valve SV2 is opened (the remaining valves are set as described above with respect to the cooling air mode). Thus, high temperature refrigerant discharged from compressor 9, rather than flowing into one end of second heat exchanger 13, instead flows into preheat heat exchanger 4, and is then returned to expansion valve 12. Heat is removed from the refrigerant at heat exchanger 4 to preheat the water in tank 6 to about 40° centigrade. Boiler 7 is also operated in the cooling air and hot-water supply mode so that the preheated hot water in hot water supply tank 6 is further heated at boiler 7 and circulates within conduit 19. The operation of heat pump 1 is controlled in accordance with a predetermined air temperature, and boiler 7 is similarly controlled in accordance with a predetermined hot water temperature.

In step R4, if the mode is not the cooling air mode, control passes to step R8. In step R8, a determination is made whether the operation mode is the heating air mode. If it is, control passes to step R9. In step R9, a determination is made whether the mode is the hot-water supply mode. If it is, control passes to step R7, and heat pump 1 and hot-water supply boiler 7 are controlled to operate in the heating air and hot-water supply mode. During operation of the heat pump in the heating air mode or here, in the heating air and hot-water supply mode, solenoid valves SV1, SV3, SV5, and SV7 are open and the remaining valves are closed, except that SV6 may also be opened (and valve SV5 may be closed) to allow heating and cooling medium from tank 16 to flow into backup boiler 3 before being distributed to room unit 2 when supplementary heat is required. Refrigerant in conduit 15, thus, flows in the direction of the solid-line arrows (FIG. 2). Refrigerant discharged from compressor 9 flows into one end of first heat exchanger 11. The gaseous refrigerant at high temperature is condensed and heat is removed from the refrigerant at heat exchanger 11 to heat the medium in tank 16. The heated medium then flows through conduit 17 into room unit 2 for heating the interior of the room. Refrigerant flows from first heat exchanger 11 to expansion valve 12. The refrigerant expands at expansion valve 12 and flow into one end of second heat exchanger 13. The refrigerant is vaporized at second heat exchanger 13 and absorbs the surrounding heat. The refrigerant then flows from the other end of heat exchanger 13 to the inlet port of compressor 9.

The operation of hot-water supply boiler 7 in the heating air and hot-water supply mode is the same as that described above with respect to the cooling air and hot-water supply mode.

In step R9, if the mode is not the hot-water supply mode, control passes to step R10. The cost of electricity per unit time required to elevate the room air temperature to a predetermined temperature is calculated in step R10 based on the inputted cost data. Control then passes to step R11, where the cost of kerosine for the same set of conditions is also calculated.

In step R12, a determination is made whether the cost of electricity equals the cost of kerosine. If it does, control passes to step R13. At step R13, because there is no cost advantage, either heat pump 1 or backup boiler 3 may be operated to heat the medium in tank 16 for distribution to room unit 2. In the preferred embodiment, heat pump 1 is operated in this situation. Control then passes back to step R1.

If the costs are not equal, control passes to step R14. At step R14, a determination is made whether the cost of electricity is greater than the cost of kerosine. If the cost of electricity is not greater than the cost of kerosine, control passes to step R15 to operate heat pump 1, as described above, in the heating air mode. Otherwise, if the cost of electricity is greater than the cost of kerosine, control passes to step R16, and backup boiler 3 is operated to heat the medium in tank 16. Solenoid valve SV6 is, therefore, opened so that medium from tank 16 flows through conduit 17 into boiler 3 where the medium is heated before being distributed to room unit 2. During operation of heat pump 1 in the heating air mode, if supplementary heat is needed, backup boiler 3 is also operated to further heat the medium from tank 16 before distributing the heated medium to room unit 2.

In step R8, if the mode is not the heating air mode, control passes to step R17. In step R17, a determination is made whether the operation mode is the hot-water supply mode. If it is not the hot-water supply mode, control passes to step R18, and the heat pump system is turned off. Otherwise, control passes to step R19. The cost of electricity per unit time required to elevate the water temperature in hot-water supply tank 6 to a predetermined temperature is calculated in step R19 on the basis of the inputted cost data. Then, control passes to step R20, and the cost of kerosine for the same conditions is also calculated.

In step R21, a determination is made whether the cost of electricity equals the cost of kerosine. If it does, control passes to step R22. Because there is no cost advantage, either heat pump 1 or hot-water supply boiler 7 may be operated to heat the water in tank 6. In the preferred embodiment, heat pump 1 is operated. Control then passes back to step R1.

If the costs are not equal, control passes to step R23. In step R23, a determination is made whether the cost of electricity is greater than the cost of kerosine. If the cost of electricity is not greater than the cost of kerosine, control passes to step R15 to operate heat pump 1. When heat pump 1 is operated in the hot-water supply mode, solenoid valves SV1 and SV4 are open, and the remaining valves are closed so that high temperature refrigerant discharged from compressor 9 flows through valve SV4 into preheat heat exchanger 5 to heat the water in hot-water supply tank 6.

Conversely, in step R23, if the cost of electricity is greater than the cost of kerosine, control passes to step R24, and boiler 7, only, is operated to heat the water in tank 6. In this situation, all of valves SV1-SV7 will be closed.

This invention has been described in detail in connection with the preferred embodiments, but these embodiments are for illustrative purposes only and the invention is not restricted thereto. It will be easily understood by those skilled in the art that other variations and modifications can be made within the scope of this invention, as defined by the following claim.

We claim:

1. A control device for a heat pump system having a hot-water supply facility and including a heat pump, a boiler and a hot-water supply tank comprising:

input means for inputting the cost of electricity for operating the heat pump and for inputting the cost of fuel for operating the boiler;

first sensor means for detecting the temperature of the ambient air;

second sensor means for detecting the moisture of the ambient air;

third sensor means for detecting the temperature of the hot-water supply;

operation means for selecting an operational mode in accordance with output signals from said sensor means;

comparison means for selecting the cheaper energy cost on the basis of cost data received from said input means in the heating air mode and in the hot-water supply mode; and control circuit means for operating either the heat pump or the boiler based on the result of the comparison performed by said comparison means.

* * * * *